United States Patent
Rykowski et al.

(10) Patent No.: US 10,965,664 B2
(45) Date of Patent: *Mar. 30, 2021

(54) SINGLE SIGN-ON FOR UNMANAGED MOBILE DEVICES

(71) Applicant: AirWatch LLC, Atlanta, GA (US)

(72) Inventors: Adam Rykowski, Alpharetta, GA (US); Ashish Jain, Los Altos, CA (US); Dale Roberts Olds, Redwood City, CA (US); Emily Hong Xu, Palo Alto, CA (US); Kabir Barday, Atlanta, GA (US); Kyle Austin, Saratoga, CA (US); Sridhara Babu Kommireddy, Alpharetta, GA (US)

(73) Assignee: AirWatch LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/236,802

(22) Filed: Dec. 31, 2018

(65) Prior Publication Data

US 2019/0141027 A1 May 9, 2019

Related U.S. Application Data

(63) Continuation of application No. 14/739,972, filed on Jun. 15, 2015, now Pat. No. 10,171,447.

(51) Int. Cl.
*H04L 29/06* (2006.01)
*G06F 21/41* (2013.01)
(Continued)

(52) U.S. Cl.
CPC .......... *H04L 63/0815* (2013.01); *G06F 21/41* (2013.01); *G06F 21/44* (2013.01);
(Continued)

(58) Field of Classification Search
CPC ... H04L 63/0815; H04L 67/02; H04L 67/306; H04L 63/0807; H04W 12/06; G06F 21/41; G06F 21/44
See application file for complete search history.

(56) References Cited

U.S. PATENT DOCUMENTS

| 5,781,909 A | 7/1998 | Logan et al. |
| 5,864,665 A | 1/1999 | Tran |

(Continued)

FOREIGN PATENT DOCUMENTS

| CN | 103503407 A | 1/2014 |
| WO | 2010083889 | 7/2010 |
| WO | 2014151227 | 9/2014 |

OTHER PUBLICATIONS

European Search Report mailed for Application No. PCT/US2016037369.

(Continued)

*Primary Examiner* — Tri M Tran
(74) *Attorney, Agent, or Firm* — Thomas | Horstemeyer LLP

(57) ABSTRACT

Disclosed are various examples for providing a single sign-on experience for mobile applications that may or may not be managed. A first application executed in a client device sends an access request to a service provider. The first application receives a redirection response from the service provider that redirects the first application to an identity provider. The first application then receives a further redirection response from the identity provider that causes the first application to request an identity assertion from a second application executed in the client device. The first application receives the identity assertion from the second application. The first authentication then authenticates with the service provider using the identity assertion.

20 Claims, 7 Drawing Sheets

(51) Int. Cl.
    *G06F 21/44* (2013.01)
    *H04W 12/06* (2021.01)
    *H04L 29/08* (2006.01)

(52) U.S. Cl.
    CPC ..... *H04W 12/0608* (2019.01); *H04L 63/0807* (2013.01); *H04L 67/02* (2013.01); *H04L 67/306* (2013.01)

(56) References Cited

U.S. PATENT DOCUMENTS

| | | | |
|---|---|---|---|
| 5,930,786 | A | 7/1999 | Carino et al. |
| 7,231,663 | B2 | 6/2007 | Medvinsky |
| 7,788,711 | B1 | 8/2010 | Sun et al. |
| 8,145,909 | B1 | 3/2012 | Agrawal et al. |
| 8,510,818 | B2 | 8/2013 | Garg et al. |
| 8,613,055 | B1 | 12/2013 | Tomilson et al. |
| 8,635,373 | B1 | 1/2014 | Supramaniam et al. |
| 8,650,622 | B2 * | 2/2014 | Murakami ...... H04W 12/04031 726/4 |
| 8,745,718 | B1 | 6/2014 | Dufel et al. |
| 8,762,947 | B2 | 6/2014 | Lee et al. |
| 8,850,546 | B1 | 9/2014 | Field et al. |
| 8,984,149 | B1 | 3/2015 | Martini |
| 9,106,642 | B1 | 8/2015 | Bhimanaik |
| 9,166,968 | B2 | 10/2015 | Hosoda |
| 9,225,711 | B1 * | 12/2015 | Sorensen ........... H04L 63/0815 |
| 9,866,546 | B2 | 1/2018 | Brannon |
| 2002/0067732 | A1 | 6/2002 | Roy |
| 2002/0078153 | A1 | 6/2002 | Chung et al. |
| 2002/0133725 | A1 | 9/2002 | Roy et al. |
| 2003/0172090 | A1 | 9/2003 | Asunmaa et al. |
| 2004/0128542 | A1 | 7/2004 | Blakley et al. |
| 2004/0225890 | A1 | 11/2004 | Kang et al. |
| 2005/0074126 | A1 | 4/2005 | Stanko |
| 2006/0185021 | A1 | 8/2006 | Dujari et al. |
| 2006/0206707 | A1 | 9/2006 | Kostal et al. |
| 2007/0028095 | A1 | 2/2007 | Allen et al. |
| 2007/0118875 | A1 | 5/2007 | Chow et al. |
| 2007/0133806 | A1 | 6/2007 | Asano |
| 2007/0157298 | A1 | 7/2007 | Dingwall et al. |
| 2008/0072303 | A1 | 3/2008 | Syed |
| 2008/0115198 | A1 | 5/2008 | Hsu et al. |
| 2008/0133531 | A1 | 6/2008 | Baskerville et al. |
| 2008/0134049 | A1 | 6/2008 | Gupta et al. |
| 2008/0263653 | A1 | 10/2008 | Lee et al. |
| 2008/0289019 | A1 | 11/2008 | Lam |
| 2008/0301791 | A1 | 12/2008 | Smith et al. |
| 2009/0178129 | A1 | 7/2009 | Cross et al. |
| 2010/0017597 | A1 | 1/2010 | Chandwani |
| 2010/0017809 | A1 | 1/2010 | Bryant-Rich et al. |
| 2010/0082491 | A1 | 4/2010 | Rosenblatt et al. |
| 2010/0100925 | A1 | 4/2010 | Hinton |
| 2010/0138903 | A1 | 6/2010 | Medvinsky |
| 2010/0235918 | A1 | 9/2010 | Mizrahi et al. |
| 2010/0242102 | A1 | 9/2010 | Cross et al. |
| 2010/0318636 | A1 | 12/2010 | Matsumura et al. |
| 2011/0099607 | A1 | 4/2011 | Cohen |
| 2011/0126002 | A1 | 5/2011 | Fu et al. |
| 2011/0134456 | A1 | 6/2011 | Tsujimoto |
| 2011/0213966 | A1 | 9/2011 | Fu et al. |
| 2011/0231919 | A1 | 9/2011 | Vangpat et al. |
| 2011/0289573 | A1 | 11/2011 | Seidl et al. |
| 2012/0079469 | A1 | 3/2012 | Gonion |
| 2012/0079569 | A1 | 3/2012 | Mendelovich et al. |
| 2012/0144501 | A1 | 6/2012 | Vangpat et al. |
| 2012/0210413 | A1 | 8/2012 | Akula et al. |
| 2012/0245990 | A1 | 9/2012 | Agarwal |
| 2012/0272307 | A1 | 10/2012 | Buer |
| 2012/0290336 | A1 | 11/2012 | Rosenblatt et al. |
| 2012/0291114 | A1 | 11/2012 | Poliashenko et al. |
| 2012/0311663 | A1 * | 12/2012 | Seidl ........ G06F 21/41 726/1 |
| 2013/0013704 | A1 | 1/2013 | Pope et al. |
| 2013/0031631 | A1 | 1/2013 | Waltermann et al. |
| 2013/0049928 | A1 | 2/2013 | Moore et al. |
| 2013/0086652 | A1 | 4/2013 | Kavantzas et al. |
| 2013/0086669 | A1 * | 4/2013 | Sondhi ................ G06F 21/41 726/8 |
| 2013/0117831 | A1 | 5/2013 | Hook et al. |
| 2013/0124756 | A1 | 5/2013 | Voronel et al. |
| 2013/0125226 | A1 | 5/2013 | Shah et al. |
| 2013/0146663 | A1 | 6/2013 | Hart et al. |
| 2013/0191884 | A1 | 7/2013 | Leicher et al. |
| 2013/0227291 | A1 | 8/2013 | Ahmed et al. |
| 2013/0269011 | A1 | 10/2013 | Wilson |
| 2013/0276080 | A1 | 10/2013 | Nakonetzki et al. |
| 2013/0288668 | A1 | 10/2013 | Pragada et al. |
| 2013/0290226 | A1 | 10/2013 | Dokken |
| 2013/0311684 | A1 | 11/2013 | Dabbiere |
| 2013/0312061 | A1 | 11/2013 | Casals |
| 2014/0007198 | A1 | 1/2014 | Durbha et al. |
| 2014/0020051 | A1 | 1/2014 | Lu et al. |
| 2014/0020078 | A1 | 1/2014 | Canning et al. |
| 2014/0052548 | A1 | 2/2014 | Dokken, Jr. |
| 2014/0068262 | A1 | 3/2014 | Robertson et al. |
| 2014/0082715 | A1 | 3/2014 | Grajek et al. |
| 2014/0129612 | A1 | 5/2014 | Hamilton et al. |
| 2014/0156732 | A1 | 6/2014 | Lanni et al. |
| 2014/0189827 | A1 | 7/2014 | Popovich et al. |
| 2014/0189841 | A1 | 7/2014 | Metke et al. |
| 2014/0237236 | A1 | 8/2014 | Kalinichenko et al. |
| 2014/0245411 | A1 | 8/2014 | Meng et al. |
| 2014/0279622 | A1 | 9/2014 | Lamoureux et al. |
| 2014/0285337 | A1 | 9/2014 | Gebhardt |
| 2014/0298348 | A1 | 10/2014 | Qureshi |
| 2014/0310792 | A1 | 10/2014 | Hyland et al. |
| 2014/0331297 | A1 | 11/2014 | Innes et al. |
| 2014/0376403 | A1 | 12/2014 | Shao et al. |
| 2015/0046997 | A1 | 2/2015 | Gupta et al. |
| 2015/0052584 | A1 | 2/2015 | Rudraraju |
| 2015/0120572 | A1 | 4/2015 | Slade |
| 2015/0149766 | A1 | 5/2015 | Shukla et al. |
| 2015/0180868 | A1 | 6/2015 | Sng |
| 2015/0188999 | A1 | 7/2015 | Manuel-Devadoss |
| 2015/0193749 | A1 | 7/2015 | Ivanoff et al. |
| 2015/0244706 | A1 | 8/2015 | Grajek et al. |
| 2015/0249645 | A1 | 9/2015 | Sobel et al. |
| 2015/0317466 | A1 | 11/2015 | Kumar et al. |
| 2015/0365405 | A1 | 12/2015 | Kalinichenko et al. |
| 2016/0065565 | A1 | 3/2016 | Plotnik et al. |
| 2016/0077901 | A1 | 3/2016 | Roth et al. |
| 2016/0080355 | A1 | 3/2016 | Greenspan et al. |
| 2016/0119323 | A1 | 4/2016 | Krishna |
| 2016/0127351 | A1 | 5/2016 | Smith et al. |
| 2016/0156700 | A1 | 6/2016 | Chen et al. |
| 2016/0162910 | A1 | 6/2016 | Pradhan et al. |
| 2016/0164860 | A1 | 6/2016 | Dunne et al. |
| 2016/0205108 | A1 | 7/2016 | Si et al. |
| 2016/0219060 | A1 | 7/2016 | Karunakaran et al. |
| 2016/0241599 | A1 | 8/2016 | Qureshi |
| 2016/0269898 | A1 | 9/2016 | Kueh |
| 2016/0277388 | A1 | 9/2016 | Lowe et al. |
| 2016/0285847 | A1 | 9/2016 | Oberheide et al. |
| 2016/0292694 | A1 * | 10/2016 | Goldschlag ......... H04L 63/0272 |
| 2016/0032328 | A1 | 11/2016 | Sade et al. |
| 2016/0337344 | A1 | 11/2016 | Johansson et al. |
| 2017/0032111 | A1 | 2/2017 | Johansson et al. |
| 2017/0034168 | A1 | 2/2017 | Wilson et al. |
| 2017/0046758 | A1 | 2/2017 | Sheehan et al. |
| 2017/0111351 | A1 * | 4/2017 | Grajek ............... H04L 63/0853 |
| 2017/0187708 | A1 | 6/2017 | Moore et al. |
| 2018/0324172 | A1 | 11/2018 | Unnikrishnan et al. |
| 2018/0337914 | A1 | 11/2018 | Mohamad Abdul et al. |

OTHER PUBLICATIONS

Office Action dated Oct. 12, 2016 for U.S. Appl. No. 14/739,983.
International Search Report dated Oct. 7, 2016 for Application No. PCT/US2016/037369.
International Search Report dated Oct. 6, 2016 for Application No. PCT/US2016/037353.
Office Action dated Nov. 14, 2016 for U.S. Appl. No. 14/739,980.

(56) References Cited

OTHER PUBLICATIONS

Office Action dated May 30, 2017 for U.S. Appl. No. 14/739,980.
Non-Final Office Action for U.S. Appl. No. 14/739,983 dated Sep. 18, 2017.
Office Action dated Dec. 27, 2017 for U.S. Appl. No. 14/739,975.
Benkhelifa et al, On a Real World Implementation of Advanced Authentication Mechanism in a Multi-Tenant Cloud Service Delievery Platform, 2014, IEEE, pp. 1-6.
Chen; et al. (Almost) Tight Bounds and Existence Theorems for Single-Community Confluent Flows, Jul. 2007, ACM, vol. 54, No. 4, article 16, pp. 1-32.
Doyle et al, Ubiquitos Desktops with Multi-factor Authentication, 2008, IEEE, pp. 198-203.
Heckle; et al. Network Authentication Using Single Sign-on the Challenge of Aligning Mental Models. 2008, ACM, pp. 1-10.
Sharp; et al. Extending Hardware Based Mandatory Access Controls for Memory to Multicore Architectures, May 14, 2018, ACM, pp. 1-3.
Office Action dated Feb. 13, 2019 for U.S. Appl. No. 15/428,467.

\* cited by examiner

SINGLE SIGN-ON FOR UNMANAGED MOBILE DEVICES

CROSS-REFERENCE TO RELATED APPLICATIONS

This application is a continuation of, and claims priority to, co-pending U.S. patent application entitled "SINGLE SIGN-ON FOR UNMANAGED MOBILE DEVICES" and filed Jun. 15, 2015 and assigned U.S. patent application Ser. No. 14/739,972, which is related to U.S. patent application entitled "SINGLE SIGN-ON FOR MANAGED MOBILE DEVICES" and filed Jun. 15, 2015 and assigned U.S. patent application Ser. No. 14/739,975, U.S. patent application entitled "SINGLE SIGN-ON FOR MANAGED MOBILE DEVICES" and filed Jun. 15, 2015 and assigned U.S. patent application Ser. No. 14/739,980, and U.S. patent application entitled "SINGLE SIGN-ON FOR UNMANAGED MOBILE DEVICES" and filed Jun. 15, 2015 and assigned U.S. patent application Ser. No. 14/739,983, which are incorporated herein by reference in their entirety.

BACKGROUND

Users may have many different accounts for a multitude of applications and services. Examples of applications and services may include social networking services, file sharing services, email services, voice communication services, office productivity services, task tracking services, and still others. A user may have to establish a corresponding username and password to authenticate for each account. This becomes a difficult and inconvenient practice where numerous accounts are involved. Accordingly, users may set weak passwords that are short or otherwise easy to remember, share passwords among multiple accounts, use third-party password managers, or engage in other practices that might be regarded as insecure. Also, if an application requires multi-factor authentication, a user needs to provide each factor for each application, which can be frustrating.

The concept of identity federation arose as a solution to this problem. Under identity federation, a user establishes an account with a federated identity provider. To this end, the user specifies a single set of security credentials. The federated account is then linked to a multiplicity of applications and services that are provided by other organizations. When the user seeks to access applications and services that are linked to the federated account, the user can simply provide the single username, password, or other credentials of the federated account for authentication. In like manner, an organization such as an enterprise may use a directory service such as ACTIVE DIRECTORY by MICROSOFT CORPORATION in order to provide a single log-in for each of multiple applications and services of the organization.

Despite the availability of identity federation, the end user experience may still be suboptimal. Even assuming that users are able to employ a single federated account for multiple applications and services, the users may be required to enter the federated account credentials separately. For example, suppose that a user logs in with a social networking application provided by a social networking service provider that is also a federated identity provider. Subsequently, the user may want to use a file sharing application that is linked to the federated identity provider. The user may then have to supply the same username and password that was previously entered for the social networking application. Repetitively entering these security credentials for each application and service may frustrate users.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing a single sign-on experience for users of mobile devices. With a single sign-on experience, a user enters a single set of security credentials for an account and, upon authentication, the user is able to access multiple different applications and services that are linked to that account. Multi-factor authentication can also be employed where the user is required to provide a combination of knowledge, possession, or biometric authentication factors. As contemplated herein, the term "single sign-on" can include scenarios in which a user is required to re-enter security credentials due to session timeouts, inactivity periods, suspicious activities, or other events that could cause authentication of the user to be doubted.

In the context of a web browser, a single sign-on experience can be enabled by way of cookies. In response to a user logging in with a federated identity provider, a cookie can be stored on the user's device that contains a token indicating authentication. When the user later accesses another network site that supports authentication by way of the federated identity provider, the cookie is presented and the token can be exchanged for a site-specific token. Consequently, the user does not have to log in again to access the network site.

However, the single sign-on design paradigm from the browser context does not function in the context of mobile applications. Although mobile applications can invoke web views, mobile applications are often containerized. For example, the cookies of a containerized application cannot be used by other containerized applications. Even assuming that a user logs into a federated account by way of a first mobile application, the cookies and application tokens that indicate successful authentication are not made available to a second mobile application because they can have separate containers. As will be described, various implementations of the present disclosure facilitate single sign-on within mobile applications and other applications that embody this container limitation. Moreover, according to the present disclosure, the requirement to use a particular software development kit (SDK) for each application in order to implement single sign-on can be rendered unnecessary.

Specifically, in the present disclosure, examples are disclosed that enable a single sign-on experience for mobile applications that are not necessarily subject to management by a management service. Once a user signs in by way of a particular authentication application, that single sign-on can be leveraged by multiple client applications to authenticate with multiple different service providers, even if the client applications are published by different publishers or developers.

Figure 1:
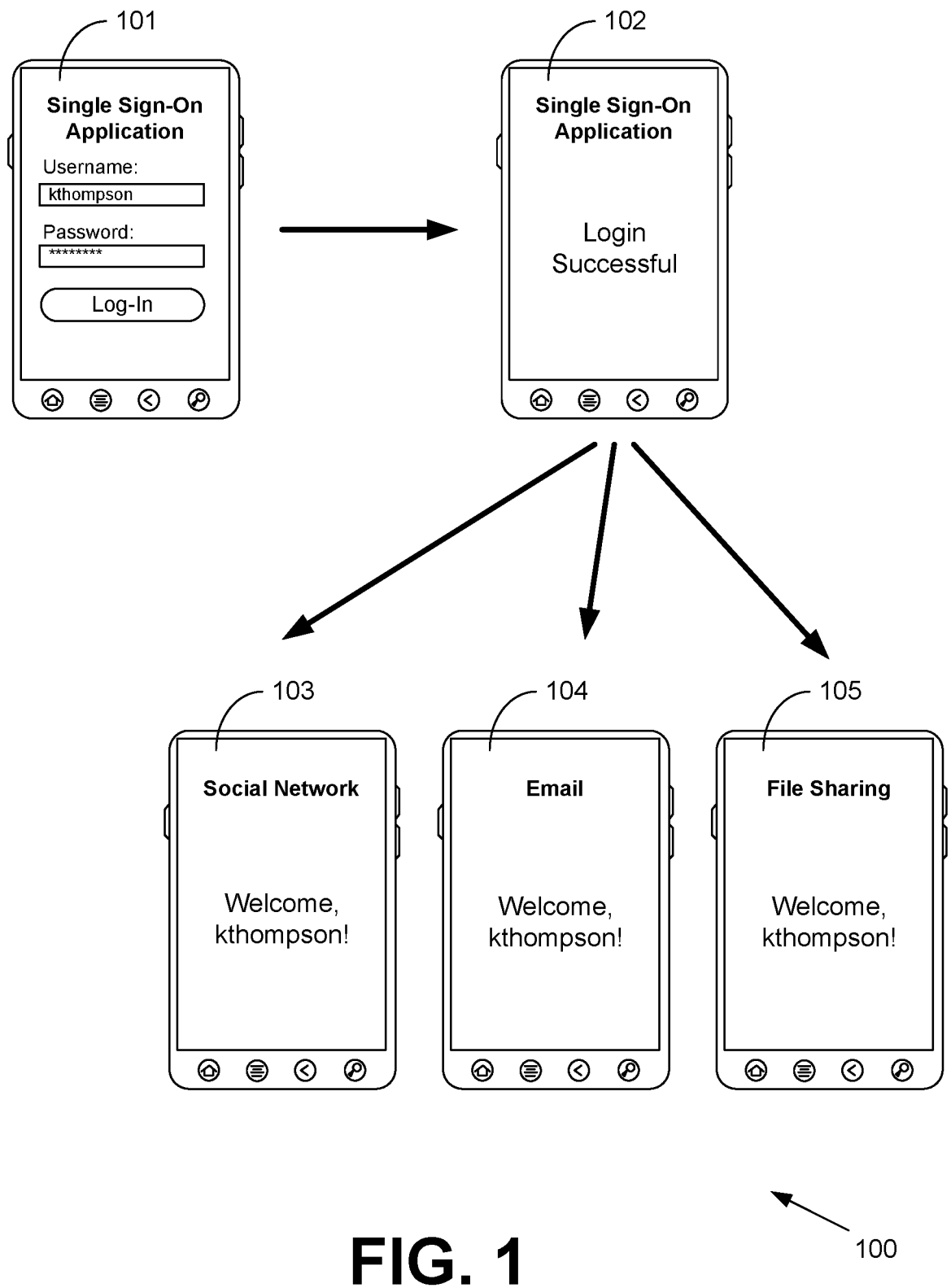
FIG. 1 is a drawing illustrating an example scenario of the disclosure.

FIG. 1 illustrates an example scenario 100 of a single sign-on experience according to the present disclosure. To begin, at 101, a user can sign in by way of a particular single sign-on application. A user interface can be rendered that requests a username, a password, and/or other authentication factors from the user. The user submits the form by way of a log-in button or other user interface component. At 102, the single sign-on application indicates that the log-in was successful. Subsequently, the user is able to authenticate his or her identity within a social network application at 103, an email application at 104, a file sharing application at 105, and potentially other applications without having to provide security credentials.

Figure 2:
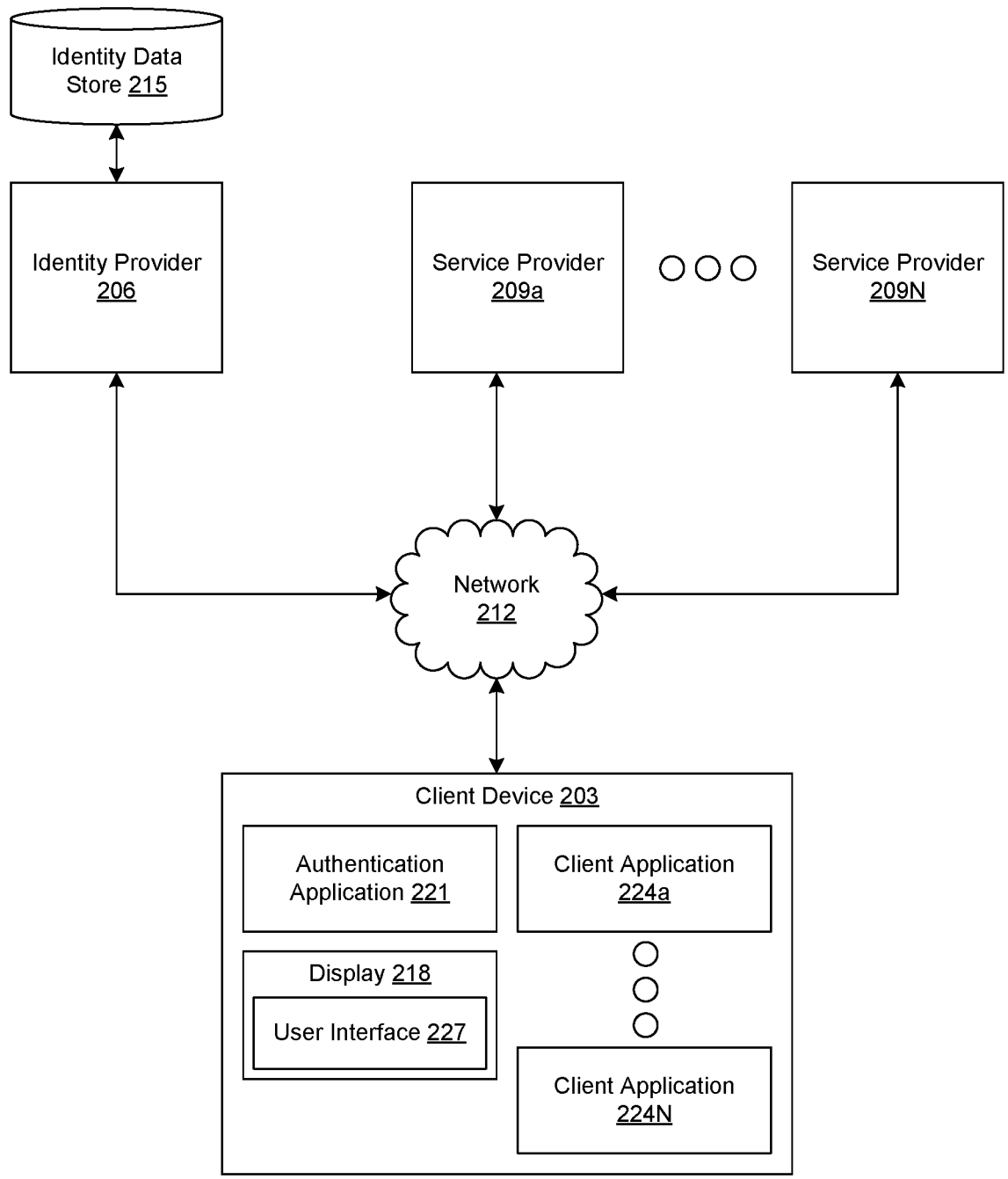
FIG. 2 is a drawing of a networked environment according to various examples of the disclosure.

With reference to FIG. 2, shown is a networked environment 200 according to various examples. The networked environment 200 includes a client device 203, an identity provider 206, and a plurality of service providers 209a . . . 209N, which can be in data communication with one another over the network 212. The network 212 includes, for example, the Internet, one or more intranets, extranets, wide area networks (WANs), local area networks (LANs), wired networks, wireless networks, other suitable networks, or any combination of two or more such networks. For example, the networks can include satellite networks, cable networks, Ethernet networks, and other types of networks.

The identity provider 206 and the service providers 209 can include, for example, a server computer or any other system providing computing capabilities. Alternatively, the identity provider 206 and the service providers 209 can employ multiple computing devices that can be arranged, for example, in one or more server banks, computer banks, or other arrangements. The computing devices can be located in a single installation or can be distributed among many different geographical locations. For example, the identity provider 206 and the service providers 209 can include multiple computing devices that together form a hosted computing resource, a grid computing resource, or any other distributed computing arrangement. In some cases, the identity provider 206 and the service providers 209 can operate as at least a portion of an elastic computing resource where the allotted capacity of processing, network, storage, or other computing-related resources can vary over time. The identity provider 206 and the service providers 209 can also include or be operated as one or more virtualized computer instances. Generally, the identity provider 206 and the service providers 209 can be operated in accordance with particular security protocols such that they are considered trusted computing environments.

The identity provider 206 can provide a federated identity service on behalf of the service providers 209. To this end, the identity provider 206 can be in communication with an identity data store 215 that stores information associated with user identities. This information can include, for example, usernames, security credentials, biometric identity information, authorized client applications, unauthorized client applications, authorized client devices 203, unauthorized client devices 203, and so on. As will be described, users are able to authenticate by way of the identity provider 206 in order to access services provided by the multiple service providers 209.

Each of the service providers 209 provides a corresponding service for client applications. The services can include, for example, social networking services, email services, voice communication services, enterprise information management services, productivity services, game services, and so on. In some examples, one or more of the service providers 209 can authenticate users separately from the identity provider 206, thereby giving users the option to log in either with the identity provider 206 or with the service provider 209 directly.

The service providers 209 and the identity provider 206 can communicate with the client device 203 over the network 212 by way of hypertext transfer protocol (HTTP), simple object access protocol (SOAP), representational state transfer (REST), and/or other protocols.

The client device 203 can represent a processor-based system, such as a computer system, that can be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client device 203 can include a display 218 that comprises, for example, one or more devices such as liquid crystal display (LCD) displays or other types of display devices. The client device 203 can also be equipped with networking capability or networking interfaces, including a localized networking or communication capability such as an NFC capability, RFID read and/or write capability, a microphone and/or speaker, or other localized communication capability.

The client device 203 can execute various applications, such as an authentication application 221, a plurality of client applications 224a . . . 224N, and other applications, services, or processes. The authentication application 221 can receive security credentials from a user and to authenticate with the identity provider 206. Upon authentication with the identity provider 206, the authentication application 221 is able to request identity assertions from the identity provider 206 in order to authenticate the client applications 224 with the respective service providers 209 as will be described.

An identity assertion in security assertion markup language (SAML), for example, contains a packet of security information that service providers 209 use to make access control decisions. SAML supports three types of statements: authentication statements, attribute statements, and authorization decision statements. Authentication statements assert to the service provider 209 that the client device 203 authenticated with the identity provider 206 at a particular time using a particular method of authentication. An attribute statement asserts that a client device 203 is associated with certain attributes. An authorization decision statement asserts that a client application 224 is permitted to perform a certain action relative to a resource offered by the service provider 209. Extensible access control markup language (XACML) and/or other languages can be employed.

The client applications 224 correspond to a variety of applications that are employed to access services provided by the service providers 209. The client applications 224 can include a web view component, whereby the client applications 224 interact with the service providers 209 to obtain network content by way of hypertext transfer protocol (HTTP) requests and responses. However, unlike a browser that is used to access various web-based applications, one or more of the client applications 224 can be containerized applications. With containerized applications, cookies set through one client application 224 cannot be accessed by another client application 224. The client applications 224 and the authentication application 221 can individually render a respective user interface 227 upon the display 218.

Figure 3:
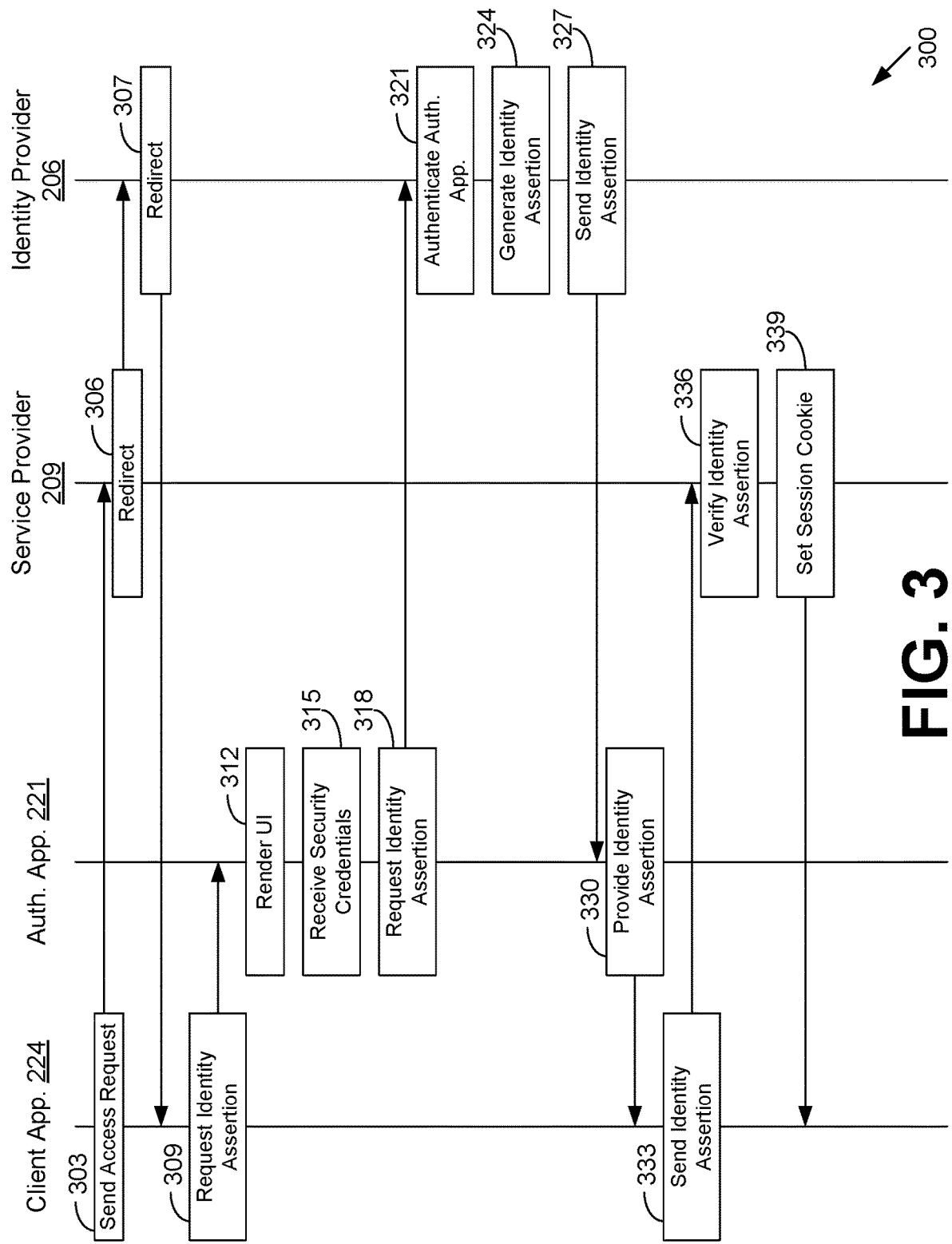
FIG. 3 is a sequence diagram illustrating an example component interaction according to various examples of the present disclosure.

Turning now to FIG. 3, shown is a sequence diagram 300 illustrating one example of interaction between the client application 224, the authentication application 221, the service provider 209, and the identity provider 206. Functionality attributed to each of the client application 224, the authentication application 221, the service provider 209, and the identity provider 206 can be implemented in a single process or application or in multiple processes or applications. The separation or segmentation of functionality as discussed herein is presented for illustrative purposes only.

At step 303, the client application 224 sends an access request to the service provider 209. At step 306, the service provider 209 redirects the client application 224 to request an identity assertion from the identity provider 206. At step 307, the request is redirected by the identity provider 206 to the authentication application 221. In various scenarios, the identity provider 206 knows about the authentication application 221, but the service provider 209 does not know about the authentication application 221. At step 309, the request for the identity assertion is redirected to the authentication application 221.

At step 312, the authentication application 221 renders a user interface 227 upon the display 228. The user interface 227 requests one or more security credentials from a user. At step 315, the authentication application 221 receives the security credentials from the user. Upon receipt of the security credentials, the authentication application 221 requests the identity assertion from the identity provider 206 at step 318. In subsequent accesses by client applications 224, the authentication application 221 can simply use a long-lived stored credential rather than user-provided credentials in order to authenticate with the identity provider 206.

At step 321, the identity provider 206 authenticates the authentication application 221 either using user-provided security credentials or a registration credential, such as a long-lived token or password. At step 324, the identity provider 206 generates the requested identity assertion assuming that the client application 224 is to be permitted access to the service provider 209 using the federated identity. At step 327, the identity provider 206 sends the identity assertion to the authentication application 221. At step 330, the authentication application 221 provides the identity assertion to the client application 224.

At step 333, the client application 224 sends the identity assertion to the service provider 209. The service provider 209 then verifies the identity assertion at step 336. At step 339, the service provider 209 sets a session cookie with the client application 224, where the session cookie includes a session token that permits the client application 224 to access resources provided by the service provider 209. Subsequently, the client application 224 can simply present the session token in order to access the protected resources without requiring an explicit log in from a user. Further, other client applications 224 can log in to service providers 209 in the manner described by FIG. 3 without requiring the user to provide credentials, assuming that a registration credential of the authentication application 221 remains valid and unexpired. That is to say, when other client applications 224 submit access requests, the flow can skip steps 312 and 315 and can rely upon the authentication application 221 to use its registration credential in order to authenticate itself with the identity provider 206. Thus, a single sign-on experience is provided for the user.

Figure 4:
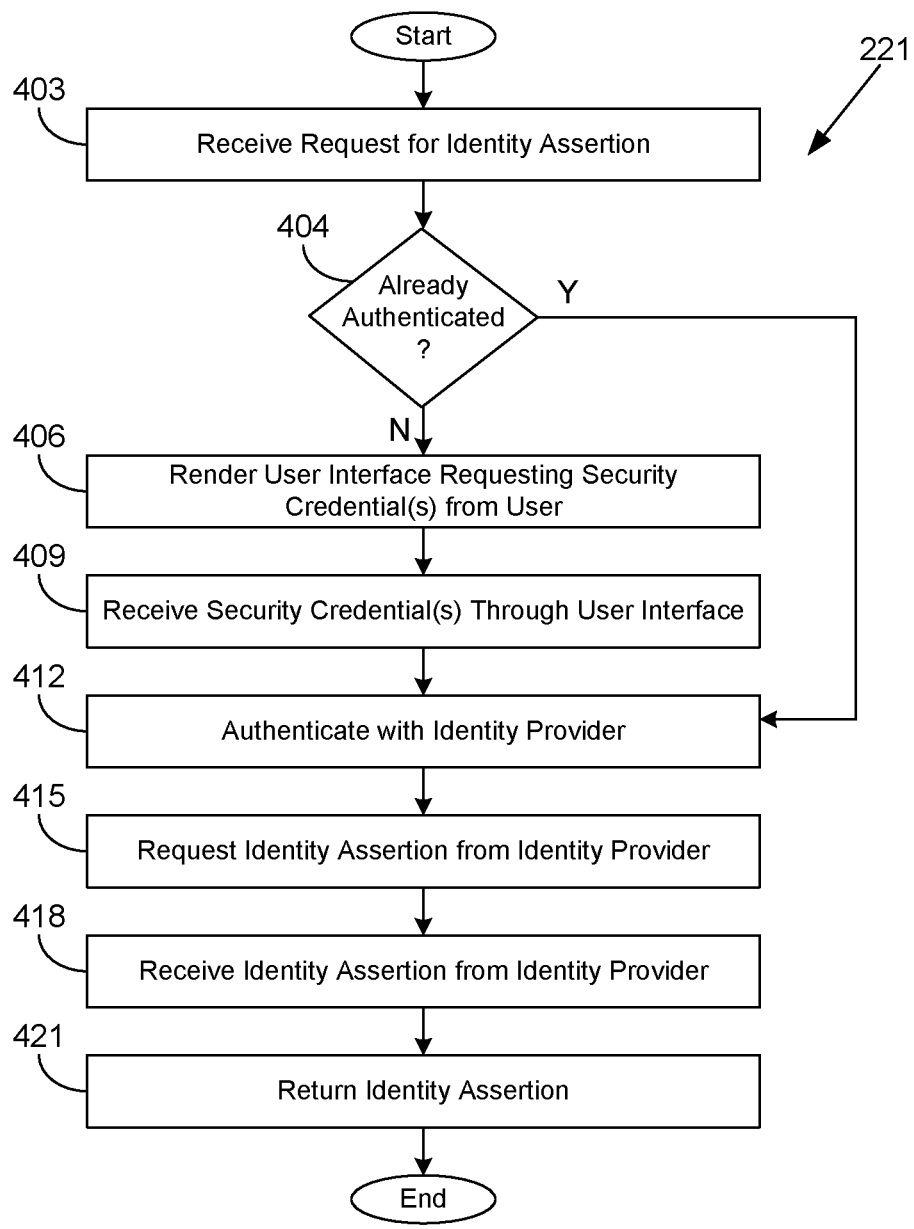
FIGS. 4-7 are flowcharts illustrating examples of functionality according to various examples of the present disclosure.

Turning now to FIG. 4, shown is a flowchart that provides one example of the operation of an authentication application 221 providing a single sign-on experience. Functionality attributed to the authentication application 221 can be implemented in a single process or application executed by the client device 203 or in multiple processes or applications. The separation or segmentation of functionality as discussed herein is presented for illustrative purposes only.

Beginning with step 403, the authentication application 221 receives a request for an identity assertion. For example, the user may have requested to access protected functionality of the client application 224. The request can be received by way of a local uniform resource locator (URL), which can specify callback information for the client application 224. The callback information specifies how the authentication application 221 can transfer the identity assertion back to the client application 224.

At step 404, the authentication application 221 determines whether the user is already authenticated. If the user is not already authenticated, the authentication application 221 moves to step 406. At step 406, the authentication application 221 can render a user interface 227 on the display 218 that can elicit one or more security credentials from a user. This can include, for example, a username, a password, a one-time password, biometric identification, and so on. At step 409, the authentication application 221 receives the security credentials by way of the user interface 227.

At step 412, the authentication application 221 authenticates with the identity provider 206 using the security credentials. If incorrect security credentials are provided, the identity provider 206 can return an error to the authentication application 221, after which the security credentials can be requested again or the process can terminate.

If instead, in step 404, the authentication application 221 determines that the user is already authenticated, the authentication application 221 transitions directly from step 404 to step 412 and can provide a token to confirm the previous authentication. In some cases, the authentication application 221 can be issued a long-lived token by the identity provider 206 to avoid having to provide the security credentials. That is to say, during subsequent authentications, the authentication application 221 can simply provide the long-lived token to identify itself to the identity provider 206.

At step 415, the authentication application 221 requests the identity assertion from the identity provider 206. The request can include an identification of the client application 224 and/or the service provider 209 for which authentication of the client application 224 is requested. At step 418, assuming that the client application 224 is to be provided with access to the service provider 209, the authentication application 221 receives the identity assertion from the identity provider 206. If the client application 224 is not to be provided access, the authentication application 221 can receive an error instead, which can be presented to a user through a user interface 227.

At step 421, the authentication application 221 returns the identity assertion. For example, the authentication application 221 can call a local URL with a predefined scheme name corresponding to the client application 224. This local URL can be determined in some cases from callback information included in the local URL that invoked the authentication application 221. The identity assertion can correspond to security assertion markup language (SAML). Thereafter, the process can proceed to completion.

Figure 5:
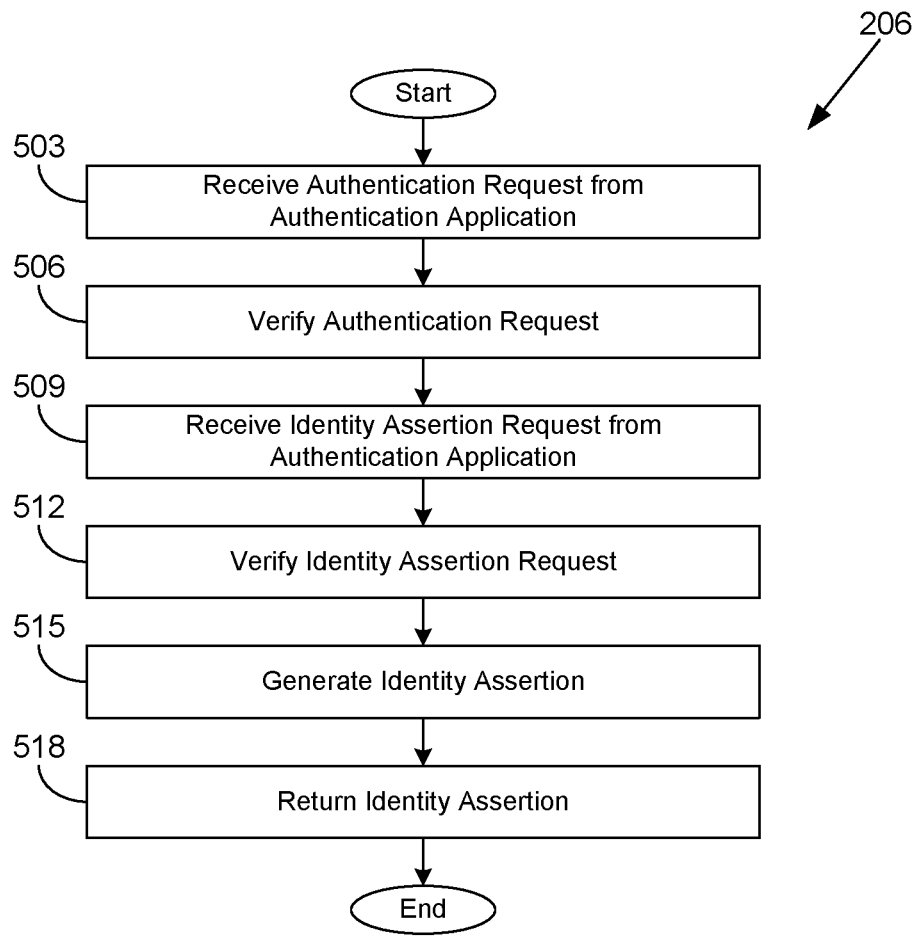

Continuing to FIG. 5, shown is a flowchart that provides one example of the operation of an identity provider 206. Functionality attributed to the identity provider 206 can be implemented in a single process or application or in multiple processes or applications. The separation or segmentation of functionality as discussed herein is presented for illustrative purposes only.

Beginning with step 503, the identity provider 206 receives an authentication request from an authentication application 221 executed in a client device 203 by way of the network 212. The authentication request can include one or more user-specified security credentials or can include a registration credential previously issued to the authentication application 221, for instance, a token or password. At step 506, the identity provider 206 verifies the authentication request based at least in part on data from the identity data store 215. For example, the identity provider 206 can compute a hash of a password supplied by a user, and then compare the hashed password with a stored hashed password in the identity data store 215. Alternatively, the identity provider 206 can verify that a registration token is authentic. If authentication of the authentication application 221 is not successful, the identity provider 206 can return an error to the authentication application 221. If authentication of the authentication application 221 is successful, the identity provider 206 continues to step 509.

At step 509, the identity provider 206 receives an identity assertion request from the authentication application 221. In some cases, the authentication request of the authentication application 221 can be embodied in the identity assertion request. The identity assertion request can include an identification of the client application 224 and/or the service provider 209 for which the client application 224 has requested access. Alternatively, the identity assertion request can be received from the client application 224 directly, but subsequent communications are channeled through the authentication application 221 as will be described. At step 512, the identity provider 206 verifies the identity assertion request. For example, the identity provider 206 can confirm that it is permitted to provide access by the client application 224 to the service provider 209 based at least in part on stored data from the identity data store 215.

At step 515, the identity provider 206 generates the identity assertion, which can include an authentication token. At step 518, the identity provider 206 returns the identity assertion to the authentication application 221. Thereafter, the process can proceed to completion.

Figure 6:
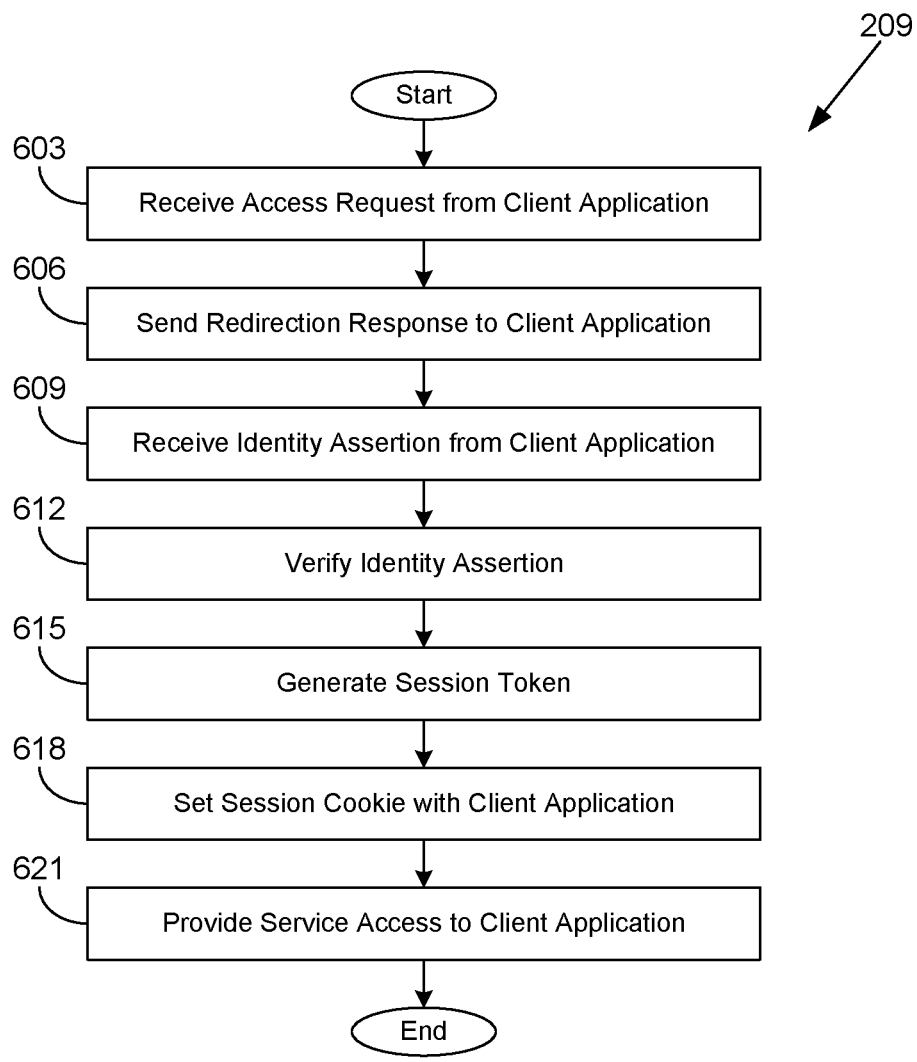

Referring next to FIG. 6, shown is a flowchart that provides one example of the operation of a service provider 209. Functionality attributed to the service provider 209 can be implemented in a single process or application or in multiple processes or applications. The separation or segmentation of functionality as discussed herein is presented for illustrative purposes only.

Beginning with step 603, the service provider 209 receives an access request from a client application 224. The service provider 209 then correlates this access request to the use of the identity provider 206 for authentication. At step 606, the service provider 209 sends a redirection response to the client application 224. This can include a hypertext transfer protocol (HTTP) redirection response with status code 302. The redirection response can redirect the client application 224 to the identity provider 206. The client application 224 can then communicate with the identity provider 206 by way of the authentication application 221. The redirection response can include security assertion markup language (SAML) that requests an identity assertion.

At step 609, the service provider 209 receives the identity assertion from the client application 224. At step 612, the service provider 209 verifies the identity assertion. For example, the identity assertion can include an authentication token generated by the identity provider 206, and the service provider 209 can confirm that the authentication token is authentic.

At step 615, the service provider 209 generates a session token. At step 618, the service provider 209 can return an HTTP response that sets a session cookie including the session token with the client application 224. The cookie can be stored by the client application 224 for later use. At step 621, the service provider 209 provides service access to the client application 224 based at least in part on the client application 224 presenting the session token, encoded as one or more parameters of a query string of a uniform resource locator (URL) or encoded within a session cookie. Thereafter, the process can proceed to completion.

Figure 7:
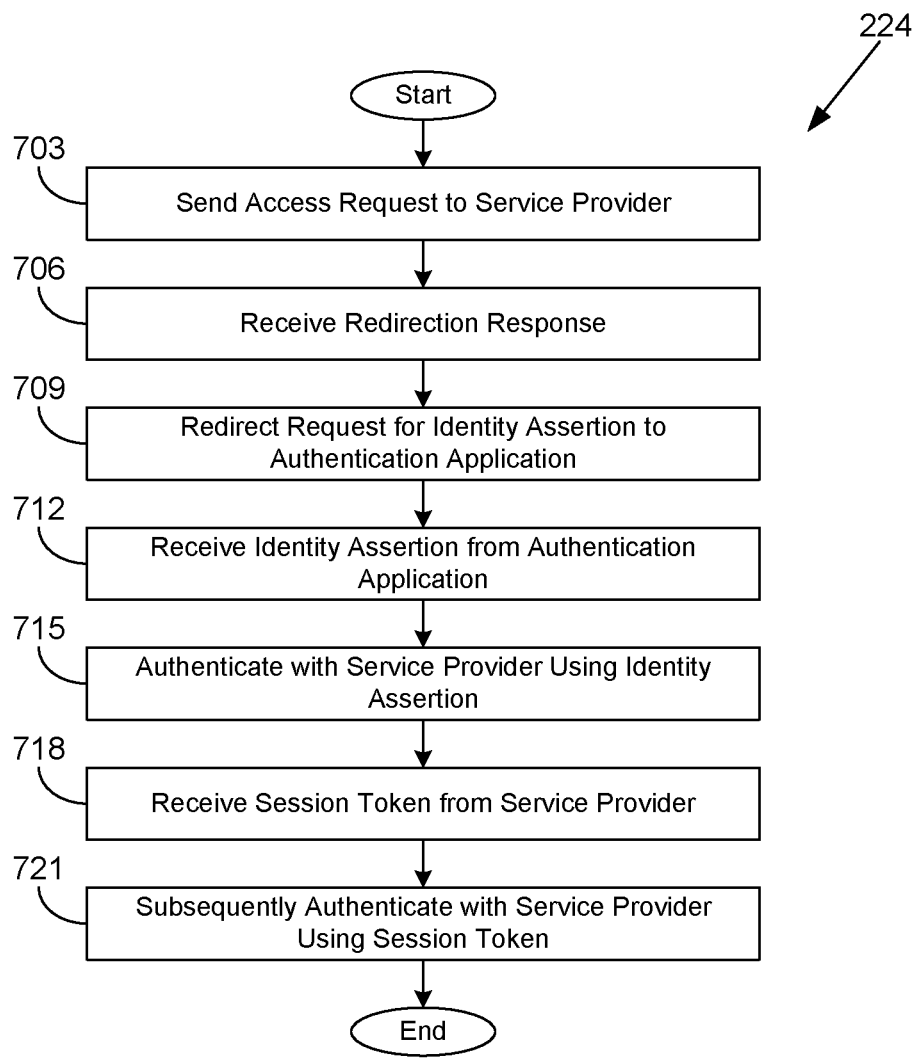

Referring next to FIG. 7, shown is a flowchart that provides one example of the operation of a client application 224. Functionality attributed to the client application 224 can be implemented in a single process or application executed by the client device 203 or in multiple processes or applications. The separation or segmentation of functionality as discussed herein is presented for illustrative purposes only.

Beginning with step 703, the client application 224 sends an access request to a service provider 209. For example, a user may have launched the client application 224 or may have otherwise requested to access protected functionality for which the user has to be logged in with the service provider 209. The protected functionality can include local functionality and/or functionality enabled by network content provided by the service provider 209. At step 706, the client application 224 receives a redirection response from the service provider 209 that redirects the client application 224 to the identity provider 206. For example, the redirection response can correspond to a hypertext transfer protocol (HTTP) response having status code 302. The redirection response can request an identity assertion from the identity provider 206 by a request expressed in security assertion markup language (SAML). The identity provider 206 can then redirect the access request to the authentication application 221.

At step 709, the client application 224 is redirected by the identity provider 206 to request the identity assertion from the authentication application 221. For example, the request can be sent by calling a local uniform resource locator (URL) that has a scheme name corresponding to the authentication application 221. The local URL can encode the request in a query string. To illustrate, the local URL can begin with "authapp://," where "authapp" is the predetermined scheme name that is registered with the client device 203 to correspond to the authentication application 221. In some implementations, a randomized unique identifier can be used instead to enhance security. The local URL can specify callback information, which can include a scheme name corresponding to the client application 224. This scheme name also can correspond to a randomized unique identifier. The callback information can allow the authentication application 221 to call back to the client application 224 in order to return the requested identity assertion.

At step 712, the client application 224 receives the identity assertion from the authentication application 221.

For example, the identity assertion can be received through the use of a local URL that encodes the identity assertion. As the local URLs are invoked, some screen flipping can be perceived upon the display 218 in some cases. Screen flipping can result from applications calling one another or when an operating system does not permit background applications. The identity assertion can include an authentication token generated by the identity provider 206. At step 715, the client application 224 authenticates with the service provider 209 using the identity assertion. In one scenario, the identity provider 206 can redirect the client application 224 to the service provider 209 to provide the identity assertion.

At step 718, the client application 224 can receive a session token from the service provider 209. The session token can correspond to an OAuth token. For example, the session token can be provided within a cookie, which the client application 224 can store in its container or data store for later retrieval. At step 721, the client application 224 can subsequently authenticate with the service provider 209 using the session token during the course of a session. During the session, the client application 224 is able to request protected network content from the service provider 209 or perform other actions that might require user authentication. Thereafter, the process can proceed to completion.

The flowcharts of FIGS. 4-7 and the sequence diagram of FIG. 3 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The client device 203, the identity provider 206, the service providers 209, or other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the identity provider 206, the service providers 209, the authentication application 221, the client applications 224, and/or other components can be stored in one or more storage devices and be executable by one or more processors. Also, a data store, such as the data store 121 can be stored in the one or more storage devices.

The identity provider 206, the service providers 209, the authentication application 221, the client applications 224, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A non-transitory computer-readable medium embodying a program executable in a client device, the program, when executed by the client device, being configured to cause the client device to at least:

receive a first request for an identity assertion from a client application executed in the client device, the first request being initially redirected from a service provider to an identity provider and subsequently redirected from the identity provider to the program, the first request received through a uniform resource locator (URL) corresponding to the program, the URL having a unique identifier;

authenticate with the identity provider using at least one security credential;

send a second request for the identity assertion to the identity provider;

receive the identity assertion from the identity provider; and send the identity assertion to the client application.

2. The non-transitory computer-readable medium of claim 1, wherein the program, when executed by the client device, is further configured to cause the client device to at least:

render a user interface configured to receive the at least one security credential from a user of the client device; and receive the at least one security credential through the user interface.

3. The non-transitory computer-readable medium of claim 1, wherein the second request for the identity assertion includes an identification of the client application.

4. The non-transitory computer-readable medium of claim 1, wherein the first request for the identity assertion is received through a local uniform resource locator (URL), wherein the local URL includes callback information corresponding to the client application.

5. A system, comprising:
a computing device;
a first client application executable by the computing device;
a second client application executable by the computing device; and
the first client application is configured to cause the computing device to at least:
send an access request to a service provider;
receive a first redirection response to an identity provider from the service provider;
request an identity assertion from the identity provider in response to the first redirection response;
receive a second redirection response to the second client application from the identity provider;
request the identity assertion from the second client application in response to the second redirection response, wherein the identity assertion is requested through a uniform resource locator (URL) corresponding to the second client application, the URL having a unique identifier;
receive the identity assertion from the second client application, wherein the identity assertion is generated by the identity provider; and
authenticate with the service provider using the identity assertion.

6. The system of claim 5, wherein the first client application requests the identity assertion from the second client application by a local uniform resource locator (URL).

7. The system of claim 5, wherein the second client application is configured to facilitate a single sign-on for a plurality of client applications executable in the computing device.

8. The system of claim 5, wherein the first client application is further configured to cause the computing device to at least:
receive a session token from the service provider after authenticating; and
subsequently authenticate with the service provider using the session token.

9. The system of claim 5, wherein at least one of the first redirection response or the second redirection response comprises security assertion markup language (SAML).

10. The system of claim 5, wherein the second client application is further configured to cause the computing device to at least:
authenticate with the identity provider;
receive the identity assertion from the identity provider; and
return the identity assertion to the first client application.

11. The system of claim 10, wherein the second client application is further configured to cause the computing device to at least:
render a user interface configured to receive at least one security credential from a user;
receive the at least one security credential from the user; and
authenticate with the identity provider using the at least one security credential.

12. The system of claim 10, wherein the second client application is further configured to cause the computing device to at least send an identification of the first client application to the identity provider.

13. The system of claim 10, wherein the second client application returns the identity assertion to the first client application by calling a local uniform resource locator (URL) that encodes the identity assertion.

14. A method, comprising:
sending, by a first application executed in a client device, an access request to a service provider;
receiving, by the first application, a first redirection response from the service provider;
requesting, by the first application, an identity assertion from an identity provider in response to the first redirection response;
receiving, by the first application, a second redirection response from the identity provider;
requesting, by the first application, the identity assertion from a second application executed in the client device in response to the second redirection response, wherein the identity assertion is requested through a uniform resource locator (URL) corresponding to the second client application, the URL having a unique identifier;
receiving, by the first application, the identity assertion from the second application, wherein the identity assertion is generated by the identity provider; and
authenticating the first application with the service provider using the identity assertion.

15. The method of claim 14, wherein requesting the identity assertion from the second application further comprises sending a request for the identity assertion to the second application by calling a local uniform resource locator (URL) that encodes the request for the identity assertion.

16. The method of claim 15, wherein the local URL includes callback information corresponding to the first application.

17. The method of claim 16, wherein the callback information comprises an identifier corresponding to the first application.

18. The method of claim 14, further comprising:
requesting, by the second application, at least one security credential from a user;
authenticating the second application with the identity provider using the at least one security credential.

19. The method of claim 14, further comprising obtaining, by the second application, the identity assertion from the identity provider.

20. The method of claim 19, wherein obtaining the identity assertion from the identity provider further comprises sending a request for the identity assertion to the identity provider, the request for the identity assertion specifying an identifier of the first application.

* * * * *